US011405657B1

(12) United States Patent
Perumalla et al.

(10) Patent No.: US 11,405,657 B1
(45) Date of Patent: Aug. 2, 2022

(54) REMOTE VIRTUAL REALITY VIEWING OF AN EVENT USING CROWDSOURCING

(71) Applicant: International Business Machines Corporation, Armonk, NY (US)

(72) Inventors: Saraswathi Sailaja Perumalla, Visakhapatnam (IN); Gautam Zalpuri, Boxborough, MA (US); Shanthan Chamala, Malvern, PA (US); Venkata Vara Prasad Karri, Visakhapatnam (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/307,720

(22) Filed: May 4, 2021

(51) Int. Cl.
| | | |
|---|---|---|
| *H04N 21/21* | (2011.01) | |
| *H04N 13/117* | (2018.01) | |
| *H04N 21/218* | (2011.01) | |
| *H04N 21/234* | (2011.01) | |
| *H04N 21/2743* | (2011.01) | |
| *H04N 21/2187* | (2011.01) | |

(52) U.S. Cl.
CPC ..... *H04N 21/21805* (2013.01); *H04N 13/117* (2018.05); *H04N 21/2187* (2013.01); *H04N 21/23418* (2013.01); *H04N 21/2743* (2013.01)

(58) Field of Classification Search
CPC ........... H04N 21/21805; H04N 13/117; H04N 21/2187; H04N 21/23418; H04N 21/2743
See application file for complete search history.

(56) References Cited

U.S. PATENT DOCUMENTS

| | | | |
|---|---|---|---|
| 9,239,992 B2 | 1/2016 | Valentino | |
| 9,473,758 B1 | 10/2016 | Long et al. | |
| 9,911,175 B2* | 3/2018 | Makar | G09G 5/363 |
| 10,096,161 B2 | 10/2018 | Callaghan | |

(Continued)

FOREIGN PATENT DOCUMENTS

CN        110782118 A     2/2020

OTHER PUBLICATIONS

"360° and VR Streaming Create Engaging 360° Streaming Experiences With Wowza Software", https://www.wowza.com/live-video-streaming/virtual-reality-and-360-degree-streaming, downloaded from the internet on Mar. 23, 2021, 8 pages.

(Continued)

*Primary Examiner* — Alazar Tilahun
(74) *Attorney, Agent, or Firm* — Francis Lammes; Stephen J. Walder, Jr.; Steven Bouknight (57) ABSTRACT

A mechanism is provided for remote virtual reality viewing of an event using crowdsourcing. Each video perspective of a plurality of video perspectives of the event is analyzed to identify content and context of the event. A digital virtual reality (VR) experience (VRX) token stream of each video perspective of the plurality of video perspectives is produced based on the identified content and the identified context of the event. Responsive to a remote user initiating a viewing of a virtual reality presentation of the event, a set of digital VRX token streams of the event is presented to the remote user. Responsive to the remote user selecting one digital VRX token stream of the set of digital VRX token streams, the selected digital VRX token stream is presented to the remote user in a virtual reality format.

20 Claims, 3 Drawing Sheets

(56) References Cited

U.S. PATENT DOCUMENTS

| | | | |
|---|---|---|---|
| 10,463,962 | B2 | 11/2019 | Marks et al. |
| 10,600,235 | B2 | 3/2020 | Hutson et al. |
| 10,652,462 | B2 | 5/2020 | Bostick et al. |
| 2012/0133772 | A1 | 3/2012 | Ortiz |
| 2014/0188528 | A1 | 7/2014 | Oxenham et al. |
| 2017/0266554 | A1 | 9/2017 | Marks et al. |
| 2018/0077407 | A1 | 3/2018 | Young |
| 2019/0149731 | A1 | 5/2019 | Blazer et al. |
| 2019/0213423 | A1 | 7/2019 | Haberstroh et al. |

OTHER PUBLICATIONS

"Detecting emotions with wireless signals: Measuring your heartbeat and breath, device can tell if you're excited, happy, angry, or sad", https://www.sciencedaily.com/releases/2016/09/160921093924.htm, Sep. 21, 2016, 3 pages.

"Tone Analyzer", https://www.ibm.com/watson/services/tone-analyzer/, downloaded from the internet on Mar. 23, 2021, 11 pages.

Barzon, Beatrice, "Emotional Algorithms: How We Measure Our Emotions and Feelings", https://www.spindox.it/en/blog/emotional-algorithms-emotions/, Nov. 13, 2018, 3 pages.

Bilal, Kashif et al., "Crowdsourced Multi-View Live Video Streaming using Cloud Computing", IEEE Access, vol. 5, pp. 12635-12647, 2017, doi: 10.1109/ACCESS.2017.2720189, Jul. 2017, 13 pages.

Farnsworth, Bryn, "How to Measure Emotions and Feelings (and the Difference Between Them)", https://imotions.com/blog/difference-feelings-emotions/, Apr. 14, 2020, 10 pages.

Huston, Hannah, "How AR and VR Can Enhance Your Next Event", https://www.cvent.com/en/blog/events/enhance-your-event-with-ar-vr, Aug. 20, 2019, 13 pages.

Kanda, Taki, "Studies on Method for Measuring Human Feelings", Knowledge-Based Intelligent Information and Engineering Systems 9th International Conference, KES 2005, Melbourne, Australia, Sep. 14-16, 2005, 7 pages.

Mauss, Iris B. et al., "Measures of emotion: A review", Published in final edited form as: Cogn Emot. Feb. 1, 2009; 23(2): doi: 10.1080/02699930802204677, 23 pages.

Ortiz, Armando, "Welcome to extended reality: Transforming how employees work and learn", https://www.ibm.com/blogs/services/2019/03/14/welcome-to-extended-reality-transforming-how-employees-work-and-learn/, Mar. 14, 2019, 7 pages.

Rogers, Sol, "Are VR and AR the Future of Live Events?", https://www.forbes.com/sites/solrogers/2018/11/26/are-vr-and-ar-the-future-of-live-events/#ef0c1ab4243f, Nov. 26, 2018, 4 pages.

* cited by examiner

REMOTE VIRTUAL REALITY VIEWING OF AN EVENT USING CROWDSOURCING

BACKGROUND

The present application relates generally to an improved data processing apparatus and method and more specifically to mechanisms for using crowdsourced perspectives of an event to present a virtual reality viewing of the event to a remote user.

Currently, virtual reality (VR) is a simulated experience that can be similar to or completely different from the real world. Applications of virtual reality include entertainment (e.g. video games) and education (e.g. medical or military training). Current distinct types of VR-style technology include augmented reality and mixed reality, sometimes referred to as extended reality (XR). There are 3 primary categories of virtual reality simulations used today: non-immersive, semi-immersive, and fully-immersive simulations.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for remote virtual reality viewing of an event using crowdsourcing. The illustrative embodiment analyzes each video perspective of a plurality of video perspectives of the event to identify content and context of the event. The illustrative embodiment produces a digital virtual reality (VR) experience (VRX) token stream of each video perspective of the plurality of video perspectives based on the identified content and the identified context of the event. The illustrative embodiment presents a set of digital VRX token streams of the event to a remote user in response to the remote user initiating a viewing of a virtual reality presentation of the event. The illustrative embodiment presents a selected digital VRX token stream to the remote user in a virtual reality format in response to the remote user selecting one digital VRX token stream of the set of digital VRX token streams.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, current virtual reality (VR) provides a simulated experience that can be similar to or completely different from the real world. However, as VR becomes more mainstream, virtual reality experiences offer an opportunity to provide new experiences and more immersive perspectives to people faster, but also more interactively than current VR experiences. For example, if a user wants to enjoy a football game but is not able to attend the football game in person, the user has to watch the football game on television, if televised, and is limited to the views provided by the network that is televising the game.

In order to provide users who are not able to attend an event, who plan to attend an future event at the same location of a previous event, or the like, the illustrative embodiments provide a virtual reality event viewing mechanism for remote virtual reality viewing of an event using crowdsourcing. That is, using crowdsourced perspectives of an event in addition to generalized video perspectives using fixed cameras at event location, such as stadium cameras, stage cameras, or the like, the virtual reality event viewing mechanism of the illustrative embodiments present to a remote user virtual reality viewing of a current or past event. In one embodiment, crowdsourced users may stream the event from phones, wearable cameras, or the like. In another embodiment, professional crowdsourcing streamers may provide professionally streamed event perspectives. In yet another embodiment, other event perspectives may be streamed through autonomous bots or drones that offer perspectives typically not available or not accessible to people. With all of the streamed perspectives as well as the fixed camera perspectives, the user of the virtual reality event viewing mechanism navigates to any of the provided perspectives allowing the user to view the event from a plurality of virtual reality perspectives throughout the lifecycle of the event.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
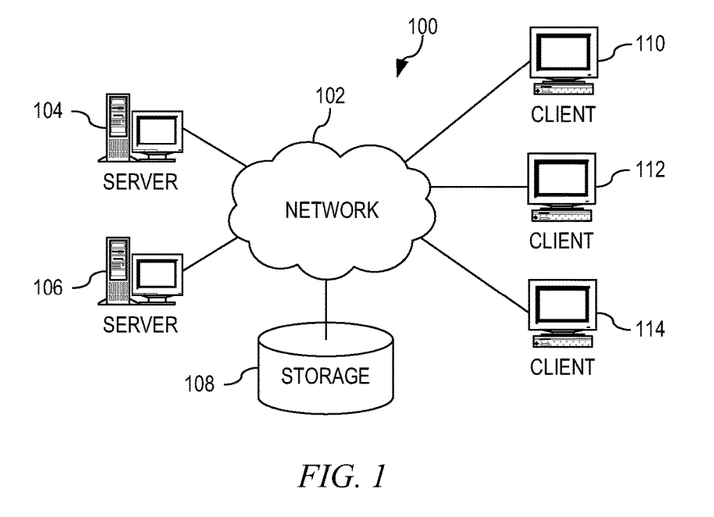
FIG. 1 is an example diagram of a distributed data processing system in which aspects of the illustrative embodiments may be implemented.
Figure 2:
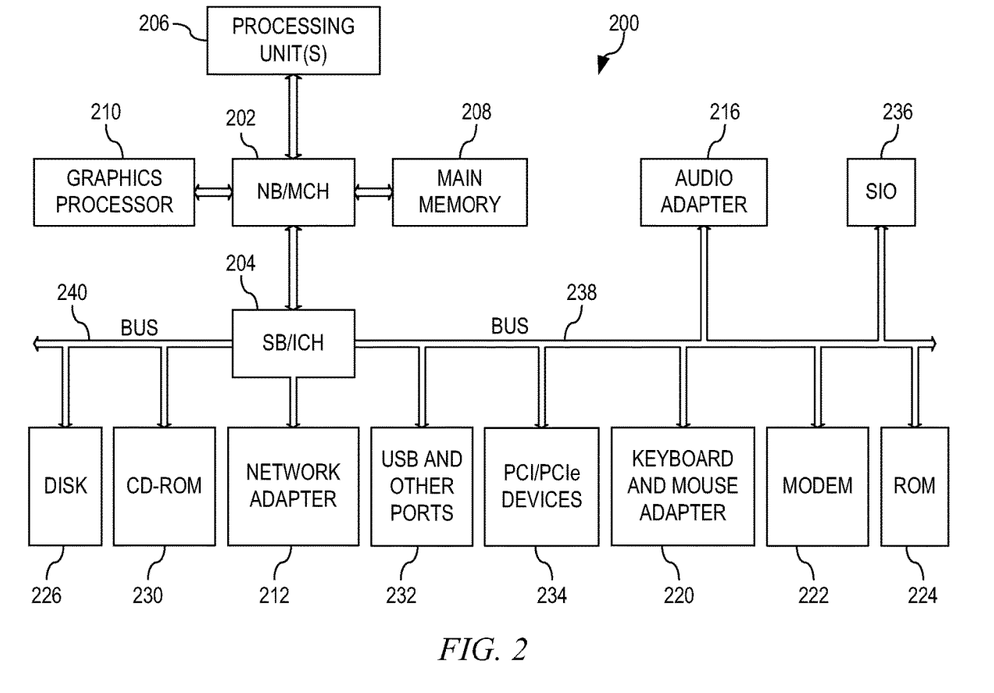
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a virtual reality event viewing mechanism for remote virtual reality viewing of an event using crowdsourcing. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates remote virtual reality viewing of an event using crowdsourcing.

As noted above, the mechanisms of the illustrative embodiments utilize specifically configured computing devices, or data processing systems, to perform the operations for remote virtual reality viewing of an event using crowdsourcing. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power Nm processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the virtual reality event viewing mechanism for remote virtual reality viewing of an event using crowdsourcing.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
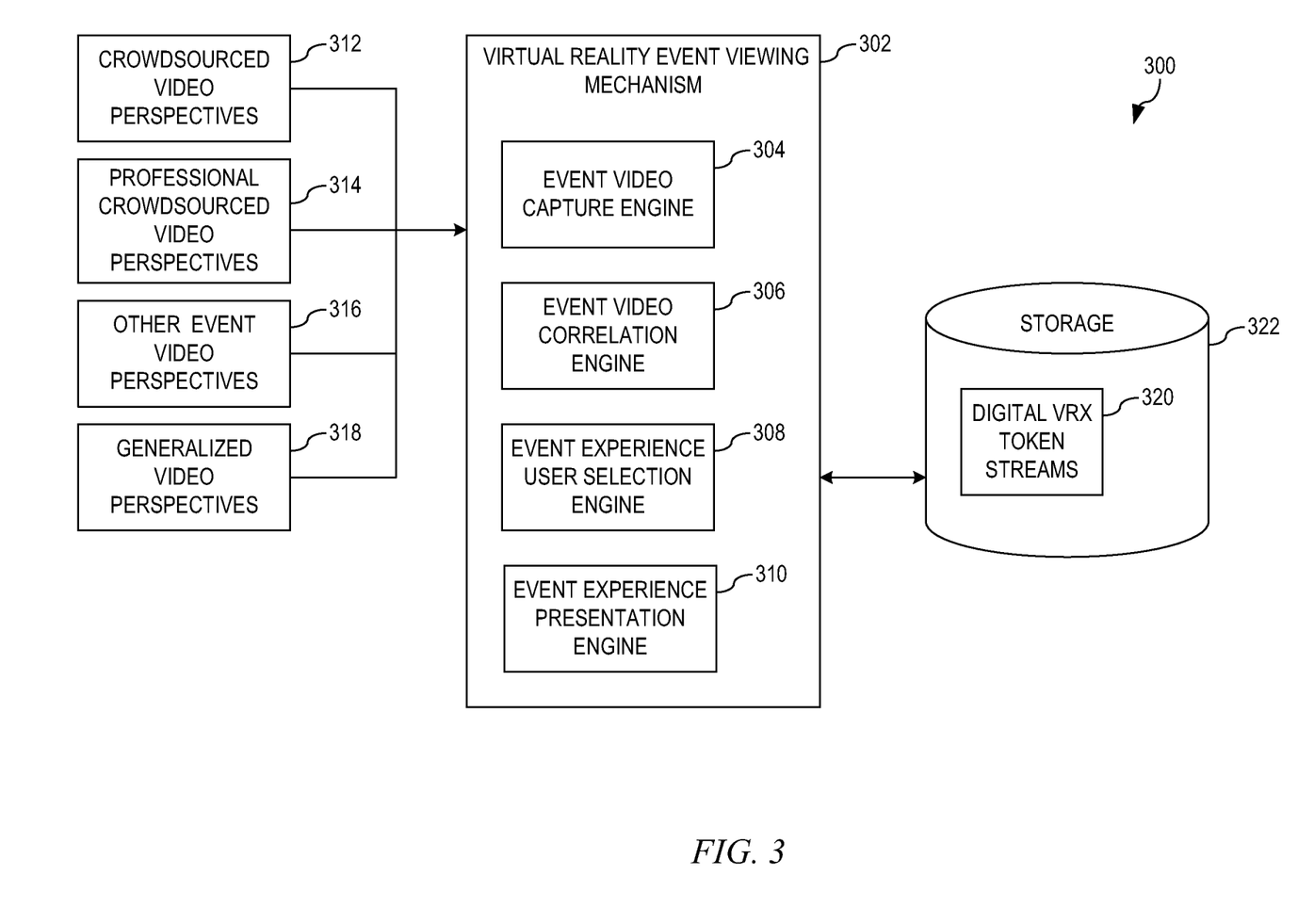
FIG. 3 depicts one example of a functional block diagram of a virtual reality event viewing mechanism for remote virtual reality viewing of an event using crowdsourcing in accordance with an illustrative embodiment.

FIG. 3 depicts one example of a functional block diagram of a virtual reality event viewing mechanism for remote virtual reality viewing of an event using crowdsourcing in accordance with an illustrative embodiment. Data processing system 300 comprises virtual reality event viewing mechanism 302 that comprises event video capture engine 304, event video correlation engine 306, event experience user selection engine 308, and event video presentation engine 310. As an event occurs, event video capture engine 304 collects crowdsourced video perspectives 312 of the event, such as a sports event, magic show, concert, or the like, from a plurality of users viewing and streaming the event. Crowdsourced video perspectives 312 may be generated from phones, wearable cameras, or the like, utilized by the users streaming the event. In accordance with the illustrative embodiments, crowdsourced video perspectives 312 are not restricted to any specific video format or video camera type. The virtual reality (VR) experience may be synthesized from multiple media sources at the event, including but not limited to live streams, photos, videos, recordings, or the like, from a variety of perspectives and locations at the event. For example, with regard to a theatre show or sports event, a proposed system user may have a preference to switch perspectives based on context, such as from the catch of a cricket ball, in front of or behind a soccer goal, or dialogue spoken at particular angle of a stage (where actor expressions has a stronger impact or entertainment factor).

In addition to crowdsourced video perspectives 312, event video capture engine 304 may also capture professional crowdsourced video perspectives 314 from professional crowdsourcing streamers streaming the event, i.e. persons having license to capture images or media content at better vantage point where as general audience recording would be from their seats and generally include other audience members (in the recording frame), as well as other event video perspectives 316 streamed through autonomous bots or drones that offer perspectives typically not available or not accessible to people. Event video capture engine 304 may also capture generalized video perspectives 318 using fixed cameras at event location, such as stadium cameras, stage cameras, or the like. In collecting the crowdsourced video perspectives 312, professional crowdsourced video perspectives 314, other event video perspectives 316, and generalized video perspectives 318, event video capture engine 304 also collects date and timestamp information associated with when the streamed video was taken and geospatial coordinate information associated with where each user streamed the event.

Utilizing the video that is captured, event video correlation engine 306 analyzes each of the crowdsourced video perspectives 312, the professional crowdsourced video perspectives 314, the other event video perspectives 316, and the generalized video perspectives 318 to identify the content, i.e. the material, matter, or medium within the video perspective, i.e. music award, sport competition, magic show, live band, or the like; and the context of the event, i.e. date, time, geospatial information, or the like; direction of video in relation to where the video is captured and where the event is taking place, i.e. left side of stage, center of stage, right side of stage, or the like; user experience of the event, i.e. gestures, interactions with event holders/actors, or the like. With regard to the user experience of the event, event video correlation engine 306 may derive the user experience information by analyzing the movement of the video, such as the video jumping up and down thereby indicating excitement, the audio associated with the video indicating cheering thereby indicating excitement, or the like. That is, event video correlation engine 306 may use artificial intelligence (AI), machine learning (ML) natural language processing (NLP) to classify, determine, or otherwise identify each of the crowdsourced video perspectives 312, the professional crowdsourced video perspectives 314, the other event video perspectives 316, and the generalized video perspectives 318 to form, as will be described hereafter, a ranking of the perspectives, and also predict the best viewing perspective for a moment in the event, based on parameters, such as, but not limited to, location, viewing direction, quality of recording, motion in recording, context to moment in event, or the like. Event video correlation engine 306 may also utilize feedback, survey responses, or the like, to adjust the ranking or rating and thereby improve the user experience as more and more viewers or audience members participate in the event.

Event video correlation engine 306 consolidates all of the information for each video perspective in the plurality of video perspectives and produces a digital virtual reality (VR) experience (VRX) token stream of the video perspective. The VRX token stream captures and classifies objects, people, dimensions, and locations for the event using multiple sources. This allows a user using virtual reality event viewing mechanism 302 to view the event stream from multiple perspectives leading to a more immersive experience, while also adjusting their view to ensure they are able to focus best on the moment in event they are focused on. This could involve, for example, in a soccer game—for a controversial goal being scored to remove players blocking views in a frame and have the system render the scene to identify what really happened. Similarly, in a crime scene investigation, being able to capture various video streams and synthesize a view for the investigator that includes details from all of them so that the user of virtual reality event viewing mechanism 302 is able to interact via the VR system to have a better understanding of the crime. The user of virtual reality event viewing mechanism 302 may also be able to re-sequence events and actors to have the system generate and predict how alternate scenarios may have played out, e.g. what if the goalkeeper at a soccer game had moved a few inches left before the kick. Therefore, event video correlation engine 306 generates the VRX experience token stream of the video based on, but not limited to, the content of the video perspective as well as the context of the video perspective, i.e. the view or direction of the device capturing the video to the screen, stage, field, or the like, but also consider user reactions, behavioral aspects and body language, to generate a VRX data packets comprised within the VRX token stream. One exemplary VRX packet may be (seat A32, 150 degrees to the stage, 9:00 pm, concert). Event video correlation engine 306 categorizes the VRX data packets by content and context, clustered by geography and user preferences to generate VRX metrics of the event, which may be utilized for ranking of the VRX token streams. That is, event video correlation engine 306 may assign VRX metrics based on parameters, such as, but not limited to, location, viewing direction, quality of recording, motion in recording, context related to a moment in event, or the like. Event video correlation engine 306 may utilize these VRX metrics to adjust the ranking or rating of the VRX token streams and thereby improve the user experience as more and more viewers or audience members participate in the event.

In order to enhance the VRX metrics, event video correlation engine 306 may also poll social circle information of the user who generated the streaming video to identify video, text, audio, or the like, indicating congratulation, likes, dislikes, emojis, feedback, comments, or the like, to generate enhanced VRX metrics based on social media input. Event video correlation engine 306 may then compare the enhanced VRX metrics extracted from variety of sources like social feeds, comments, interests, or the like, to the assigned VRX metrics to generate a true VRX metrics. That is, event video correlation engine 306 may increase, decrease, or otherwise change the assigned VRX metrics based on the enhanced VRX metrics to generate the true VRX metrics and adjust the ranking or rating of the VRX token streams suing the true VRX metrics and thereby improve the user experience as more and more viewers or audience members participate in the event.

For any VRX token stream with low VRX metrics, event video correlation engine 306 identifies gaps and replaces the missing components in them by auto accommodating the required experience. For example, if a VRX token stream has a low ranking, the VRX token stream may be for a corner seat for a magic show. Thus, event video correlation engine 306 provides feedback for an owner of the magic show to enhance those seating experience with digital screen on front seat to enable the user to have a better experience. Event video correlation engine 306 stores each digital VRX token streams 320 generated for each of the video perspectives in the plurality of video perspectives in storage 322.

With the digital VRX token stream generated for each of the video perspectives in the plurality of video perspectives, when a user wants to watch the event live, watch a previously recorded event, buy tickets for a future event, or the like, event experience user selection engine 308 presents a summary of the digital VRX token streams for the event to the user for navigation and selection thereby allowing the user to view the event from one of the plurality of virtual reality perspectives associated with the digital VRX token streams 320. In one embodiment, event experience user selection engine 308 present information associated with all the digital VRX token streams 320 ranked according to the associated VRX metrics. For example, if the user wants to buy tickets for a concert and selects a particular seat, then event experience user selection engine 308 identifies a digital VRX token stream from digital VRX token streams 320 associated with that seat. Upon the user selecting the identified digital VRX token stream, event experience user selection engine 308 provides the identified digital VRX token stream to event video presentation engine 310 which presents a predetermined portion of the identified digital VRX token stream to the user in a VR format.

As another example, if a user initiates a viewing of a live event, then event experience user selection engine 308 identifies one or more digital VRX token stream from digital VRX token streams 320 associated a plurality of video perspectives from other users that are already live streaming the event. Upon the user selecting one of the plurality of video perspectives from other users that are already live streaming the event, event experience user selection engine 308 provides the identified digital VRX token stream to event video presentation engine 310 which presents live streaming of the event to the user in a VR format. It is noted that the user may change to other ones of the plurality of video perspectives from other users that are already live streaming the event as the event continues, thereby allowing the user to "always have the best seat" from the user's perspective.

In yet another example, if the user initiates a viewing of a previously recorded event, again, event experience user selection engine 308 presents a summary of the digital VRX token streams 320 of the previously recorded event to the user for navigation and selection thereby allowing the user to view the event from one of the plurality of virtual reality perspectives associated with the digital VRX token streams 320. Upon the user selecting the identified digital VRX token stream, event experience user selection engine 308 provides the identified digital VRX token stream to event video presentation engine 310 which presents the identified digital VRX token stream to the user in a VR format. Thus, virtual reality event viewing mechanism 302 assists users who want to watch an event to effectively choose their available seats and/or locations by referring the digital VRX token streams 320 associated with the event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
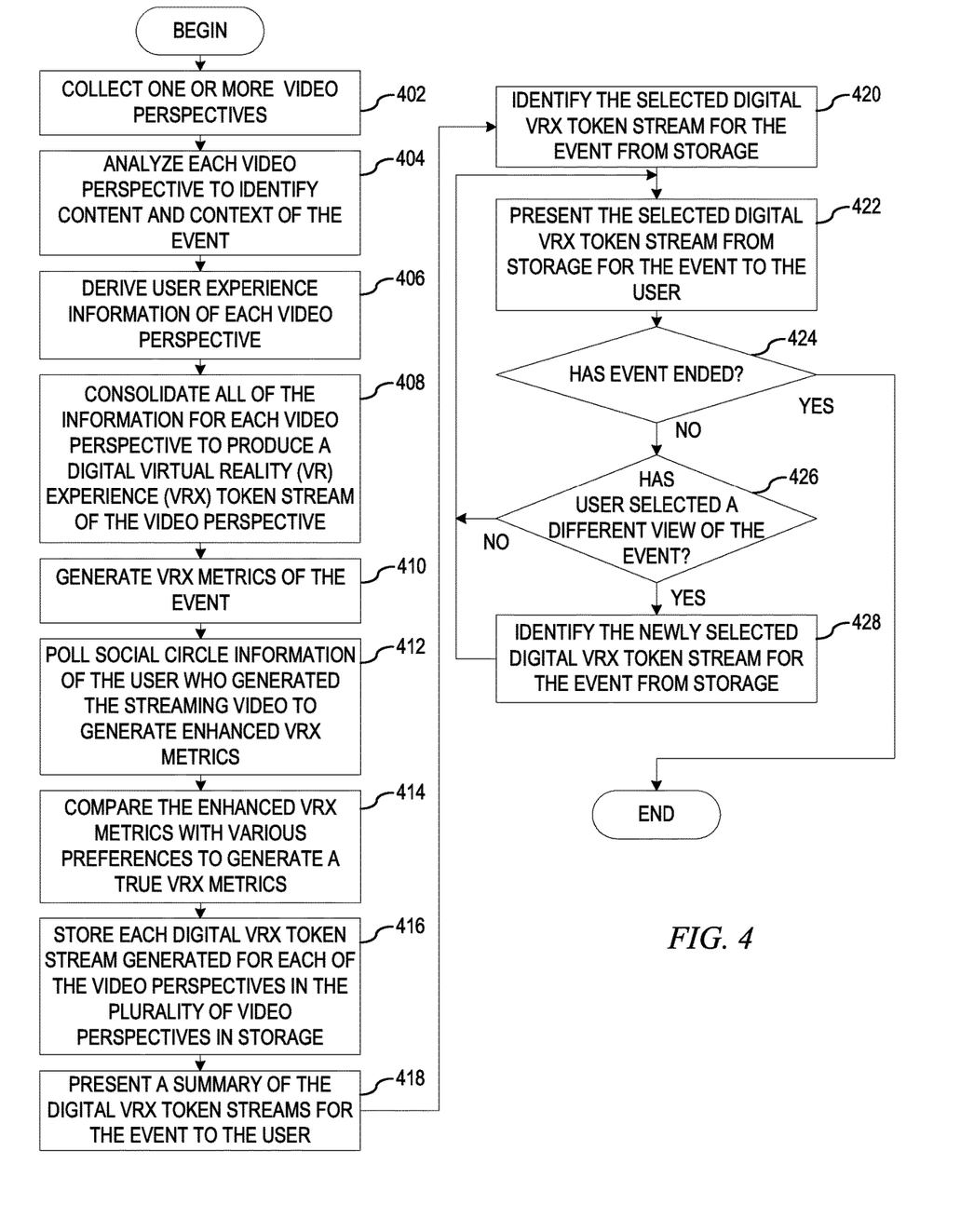
FIG. 4 depicts one example of a flowchart describing the operations performed by a virtual reality event viewing mechanism for remote virtual reality viewing of an event using crowdsourcing in accordance with an illustrative embodiment.

FIG. 4 depicts one example of a flowchart describing the operations performed by a virtual reality event viewing mechanism for remote virtual reality viewing of an event using crowdsourcing in accordance with an illustrative embodiment. As the operation begins, the virtual reality event viewing mechanism collects one or more of video perspectives, for example, crowdsourced video perspectives, professional crowdsourced video perspectives, other event video perspectives, or generalized video perspectives (step 402). In one illustrative embodiment, the crowdsourced video perspectives may be generated from phones, wearable cameras, or the like, utilized by the users streaming the event. In another illustrative embodiment, the professional crowdsourced video perspectives may be generated by professional crowdsourcing streamers streaming the event. In yet another illustrative embodiment, the other event video perspectives may be from autonomous bots or drones that offer perspectives typically not available or not accessible to people. Further, in another illustrative embodiment, the generalized video perspectives may be from fixed cameras at event location, such as stadium cameras, stage cameras, or the like. In collecting the crowdsourced video perspectives, the professional crowdsourced video perspectives, the other event video perspectives, and the generalized video perspectives, the virtual reality event viewing mechanism also collects date and timestamp information associated with when the streamed video was taken and geospatial coordinate information associated with where each user streamed the event.

Utilizing the video perspectives that are captured, the virtual reality event viewing mechanism analyzes each of the video perspectives to identify the content, i.e. the material, matter, or medium within the video perspective, i.e. music award, sport competition, magic show, live band, or the like; and the context of the event (step 404), i.e. date, time, geospatial information, or the like; direction of video in relation to where the video is captured and where the event is taking place, i.e. left side of stage, center of stage, right side of stage, or the like; user experience of the event, i.e. gestures, interactions with event holders/actors, or the like. The virtual reality event viewing mechanism then derives the user experience information of each video perspective (step 406) by analyzing the movement of the video, such as the video jumping up and down thereby indicating excitement, the audio associated with the video indicating cheering thereby indicating excitement, or the like.

The virtual reality event viewing mechanism consolidates all of the information for each video perspective in the plurality of video perspectives and produces a digital virtual reality (VR) experience (VRX) token stream of the video perspective (step 408). Event video correlation engine 306 generates the VRX experience token stream of the video based on, but not limited to, the view or direction of the device capturing the video to the screen, stage, field, or the like, but also consider user reactions, behavioral aspects and body language, and the context to generate a VRX data packets comprised within the VRX token stream. The virtual reality event viewing mechanism then categorizes the VRX data packets by content and context, clustered by geography and user preferences to generate VRX metrics of the event (step 410), which may be utilized for ranking of the VRX token streams. One exemplary VRX packet may be (seat A32, 150 degrees to the stage, 9:00 pm, concert).

In order to enhance the VRX metrics, the virtual reality event viewing mechanism may also poll social circle information of the user who generated the streaming video to identify video, text, audio, or the like, indicating congratulation, likes, dislikes, emojis, feedback, comments, or the like, to generate enhanced VRX metrics (step 412). Event video correlation engine 306 may then compare the enhanced VRX metrics with various online, offline, virtual visitor or the like, preferences extracted from variety of sources like social feeds, comments, interests, or the like, to generate a true VRX metrics (step 414).

For any VRX token stream with low VRX metrics, the virtual reality event viewing mechanism identifies gaps and replaces the missing components in them by auto accommodating the required experience. For example, if a VRX token stream has a low ranking, the VRX token stream may be for a corner seat for a magic show. Thus, the virtual reality event viewing mechanism provides feedback for an owner of the magic show to enhance those seating experience with digital screen on front seat to enable the user to have a better experience. The virtual reality event viewing mechanism stores each digital VRX token stream generated for each of the video perspectives in the plurality of video perspectives in storage (step 416).

With the digital VRX token stream generated for each of the video perspectives in the plurality of video perspectives, when a user wants to watch the event live, watch a previously recorded event, buy tickets for a future event, or the like, the virtual reality event viewing mechanism presents a summary of the digital VRX token streams for the event to the user (step 418) for navigation and selection thereby allowing the user to view the event from one of the plurality of virtual reality perspectives associated with the plurality of digital VRX token streams. The virtual reality event viewing mechanism then identifies the selected digital VRX token stream for the event from storage (step 420) presents the selected digital VRX token stream from storage for the event to the user (step 422). The virtual reality event viewing mechanism then determines whether the event has ended (step 424). If at step 424 the event has ended, the operation terminates. If at step 424 the event has not ended, the virtual reality event viewing mechanism determines whether the user has selected a different view of the event from the summary (step 426). If at step 426 the user has not selected a different view, the operation returns to step 422. If at step 426 the user has selected a different view, the virtual reality event viewing mechanism identifies the newly selected digital VRX token stream for the event from storage (step 428), with the operation proceeding to step 420 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a virtual reality event viewing mechanism for remote virtual reality viewing of an event using crowdsourcing. Using crowdsourced perspectives of an event in addition to generalized video perspectives using fixed cameras at event location, such as stadium cameras, stage cameras, or the like, the virtual reality event viewing mechanism of the illustrative embodiments present to a remote user virtual reality viewing of a current or past event. In one embodiment, crowdsourced users may stream the event from phones, wearable cameras, or the like. In another embodiment, professional crowdsourcing streamers may provide professionally streamed event perspectives. In yet another embodiment, other event perspectives may be streamed through autonomous bots or drones that offer perspectives typically not available or not accessible to people. With all of the streamed perspectives as well as the fixed camera perspectives, the user of the virtual reality event viewing mechanism navigates to any of the provided perspectives allowing the user to view the event from a plurality of virtual reality perspectives throughout the lifecycle of the event.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless 110 interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for remote virtual reality viewing of an event using crowdsourcing, the method comprising:
   analyzing each video perspective of a plurality of video perspectives of the event to identify content and context of the event;
   producing a digital virtual reality (VR) experience (VRX) token stream of each video perspective of the plurality of video perspectives based on the identified content and the identified context of the event;
   responsive to a remote user initiating a viewing of a virtual reality presentation of the event, presenting a set of digital VRX token streams of the event to the remote user; and
   responsive to the remote user selecting one digital VRX token stream of the set of digital VRX token streams, presenting the selected digital VRX token stream to the remote user in a virtual reality format.

2. The method of claim 1, wherein the remote user can switch from the selected digital VRX token stream to another digital VRX token stream of the set of digital VRX token streams while the event is occurring.

3. The method of claim 1, wherein presenting the set of digital VRX token streams of the event to the remote user further comprises:
   assigning a VRX metric to each VRX token stream by categorizing VRX data packets within the VRX token stream; and
   utilizing the VRX metrics associated with each digital VRX token stream in the set of digital VRX token streams to rank the set of digital VRX token streams presented to the remote user.

4. The method of claim 3, further comprising:
   enhancing the VRX metric associated with a particular digital VRX token stream using social media information related to the video perspective from which the VRX token stream was generated thereby forming an enhanced VRX metric;
   comparing the enhanced VRX metric to the assigned VRX metric to generate true VRX metrics; and
   utilizing the true VRX metrics associated with each digital VRX token stream in the set of digital VRX token streams to rerank the set of digital VRX token streams presented to the remote user.

5. The method of claim 1, wherein the plurality of video perspectives of the event are collected from uses actively viewing the event in real time and wherein the plurality of video perspectives comprise a video perspectives selected from the group comprising a crowdsourced video perspective, a professional crowdsourced video perspective, other event video perspective, and a generalized video perspective.

6. The method of claim 1, wherein the identified content of the event identifies the material, matter, or medium within the video perspective and wherein the identified context of the event comprises one or more of a date, a time, geospatial information, direction of the video perspective video in relation to where the video perspective is captured.

7. The method of claim 1, wherein the selected digital VRX token stream to the remote user in real time or at a time after the event has occurred.

8. A computer program product comprising a computer readable storage medium having a computer readable program for remote virtual reality viewing of an event using crowdsourcing stored therein, wherein the computer readable program, when executed on a computing device, causes the computing device to:
   analyze each video perspective of a plurality of video perspectives of the event to identify content and context of the event;
   produce a digital virtual reality (VR) experience (VRX) token stream of each video perspective of the plurality of video perspectives based on the identified content and the identified context of the event;
   responsive to a remote user initiating a viewing of a virtual reality presentation of the event, present a set of digital VRX token streams of the event to the remote user; and
   responsive to the remote user selecting one digital VRX token stream of the set of digital VRX token streams, present the selected digital VRX token stream to the remote user in a virtual reality format.

9. The computer program product of claim 8, wherein the remote user can switch from the selected digital VRX token stream to another digital VRX token stream of the set of digital VRX token streams while the event is occurring.

10. The computer program product of claim 8, wherein the computer readable program for presenting the set of digital VRX token streams of the event to the remote user further causes the computing device to:
    assign a VRX metric to each VRX token stream by categorizing VRX data packets within the VRX token stream; and
    utilize the VRX metrics associated with each digital VRX token stream in the set of digital VRX token streams to rank the set of digital VRX token streams presented to the remote user.

11. The computer program product of claim 10, wherein the computer readable program further causes the computing device to:
    enhance the VRX metric associated with a particular digital VRX token stream using social media information related to the video perspective from which the VRX token stream was generated thereby forming an enhanced VRX metric;
    compare the enhanced VRX metric to the assigned VRX metric to generate true VRX metrics; and
    utilize the true VRX metrics associated with each digital VRX token stream in the set of digital VRX token streams to rerank the set of digital VRX token streams presented to the remote user.

12. The computer program product of claim 8, wherein the plurality of video perspectives of the event are collected from uses actively viewing the event in real time and wherein the plurality of video perspectives comprise a video perspectives selected from the group comprising a crowdsourced video perspective, a professional crowdsourced video perspective, other event video perspective, and a generalized video perspective.

13. The computer program product of claim 8, wherein the identified content of the event identifies the material, matter, or medium within the video perspective and wherein the identified context of the event comprises one or more of a date, a time, geospatial information, direction of the video perspective video in relation to where the video perspective is captured.

14. The computer program product of claim 8, wherein the selected digital VRX token stream to the remote user in real time or at a time after the event has occurred.

15. An apparatus for remote virtual reality viewing of an event using crowdsourcing comprising:
- a processor; and
- a memory coupled to the processor, wherein the memory comprises instructions which, when executed by the processor, cause the processor to:
- analyze each video perspective of a plurality of video perspectives of the event to identify content and context of the event;
- produce a digital virtual reality (VR) experience (VRX) token stream of each video perspective of the plurality of video perspectives based on the identified content and the identified context of the event;
- responsive to a remote user initiating a viewing of a virtual reality presentation of the event, present a set of digital VRX token streams of the event to the remote user; and
- responsive to the remote user selecting one digital VRX token stream of the set of digital VRX token streams, present the selected digital VRX token stream to the remote user in a virtual reality format.

16. The apparatus of claim 15, wherein the remote user can switch from the selected digital VRX token stream to another digital VRX token stream of the set of digital VRX token streams while the event is occurring.

17. The apparatus of claim 15, wherein the instructions for presenting the set of digital VRX token streams of the event to the remote user further cause the processor to:
- assign a VRX metric to each VRX token stream by categorizing VRX data packets within the VRX token stream; and
- utilize the VRX metrics associated with each digital VRX token stream in the set of digital VRX token streams to rank the set of digital VRX token streams presented to the remote user.

18. The apparatus of claim 17, wherein the instructions further cause the processor to:
- enhance the VRX metric associated with a particular digital VRX token stream using social media information related to the video perspective from which the VRX token stream was generated thereby forming an enhanced VRX metric;
- compare the enhanced VRX metric to the assigned VRX metric to generate true VRX metrics; and
- utilize the true VRX metrics associated with each digital VRX token stream in the set of digital VRX token streams to rerank the set of digital VRX token streams presented to the remote user.

19. The apparatus of claim 15, wherein the plurality of video perspectives of the event are collected from uses actively viewing the event in real time and wherein the plurality of video perspectives comprise a video perspectives selected from the group comprising a crowdsourced video perspective, a professional crowdsourced video perspective, other event video perspective, and a generalized video perspective.

20. The apparatus of claim 15, wherein the identified content of the event identifies the material, matter, or medium within the video perspective and wherein the identified context of the event comprises one or more of a date, a time, geospatial information, direction of the video perspective video in relation to where the video perspective is captured.

* * * * *